United States Patent [19]

Martin

[11] Patent Number: 4,973,821
[45] Date of Patent: Nov. 27, 1990

[54] CONTROL UNIT FOR WELDING APPARATUS HAVING OFFSET AND TRACKING CONTROL FEATURES

[75] Inventor: Donald L. Martin, 12132 Woodlawn Ave., Santa Ana, Calif. 92705

[73] Assignee: Donald L. Martin, Irvine, Calif.

[21] Appl. No.: 332,888

[22] Filed: Apr. 3, 1989

[51] Int. Cl.⁵ ............................................... B23K 9/10
[52] U.S. Cl. ................................ 219/130.51; 219/132; 219/137.71
[58] Field of Search ...................... 219/130.51, 137.71, 219/132

[56] References Cited

U.S. PATENT DOCUMENTS

| | | | |
|---|---|---|---|
| 4,430,551 | 2/1984 | Toth | 219/137.71 |
| 4,438,317 | 3/1984 | Ueguri et al. | 219/137.71 |
| 4,475,028 | 10/1984 | McGuire, Jr. et al. | 219/130.51 |
| 4,510,373 | 4/1985 | Cox et al. | 219/132 |
| 4,608,482 | 8/1986 | Cox et al. | 219/137.71 |

Primary Examiner—Clifford C. Shaw
Attorney, Agent, or Firm—Plante, Strauss, Vanderburgh and Connors

[57] ABSTRACT

Disclosed is a control unit for welding apparatus which feeds wire in the presence of a shielding gas to a workpiece at different rates with different heat inputs in accordance with the wire feed rate. The control unit is designed so that through a single control element the workman may adjust the wire feed rate and simultaneously and automatically adjust the heat input. When different wire types are employed in different welding processes, adjustments in the control unit are provided that allow the workman to reset the relationship between the wire feed rate and heat input in accordance with the type of wire being used. A hot-start feature is provided so that more power is applied for a predetermined manually adjusted time period during start-up.

7 Claims, 5 Drawing Sheets

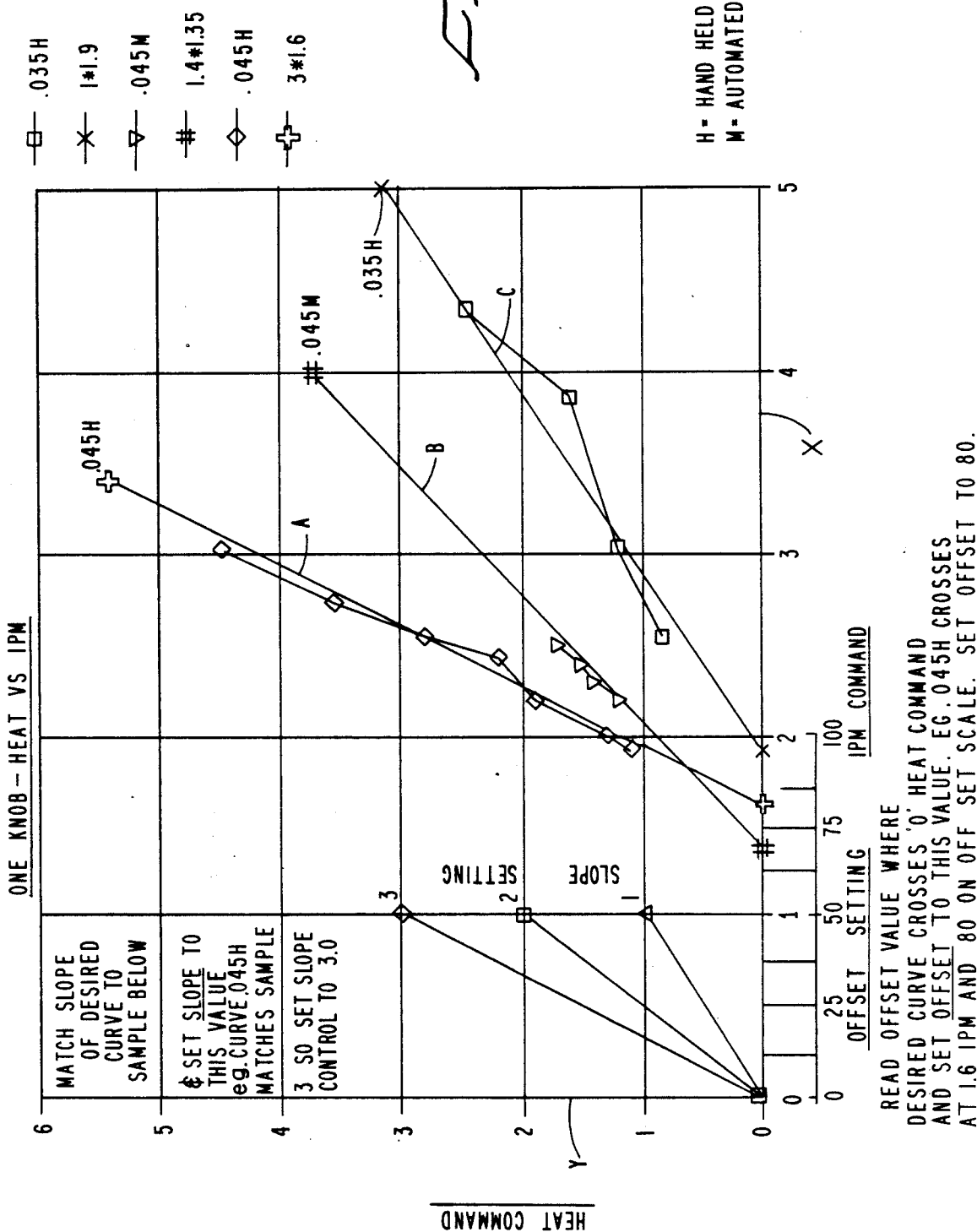

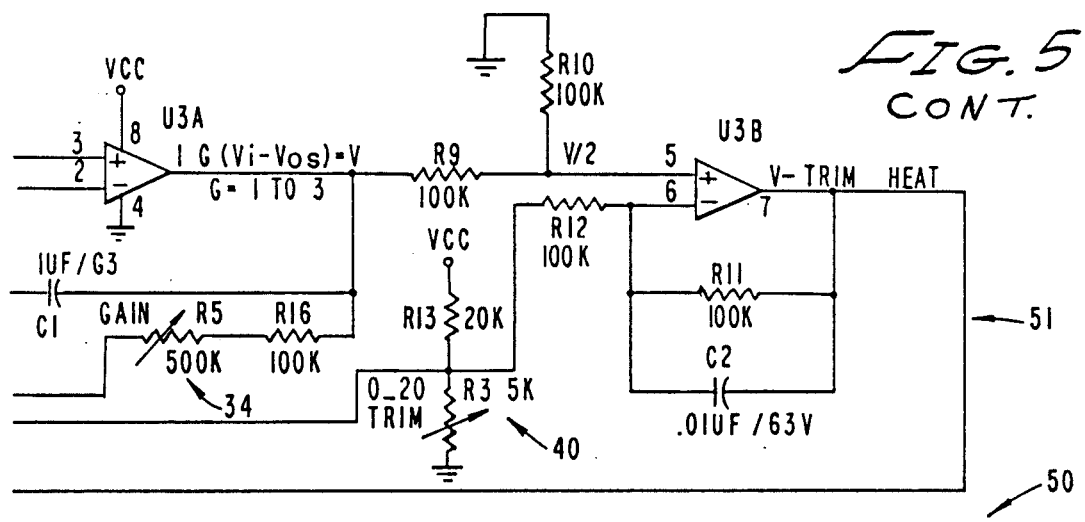
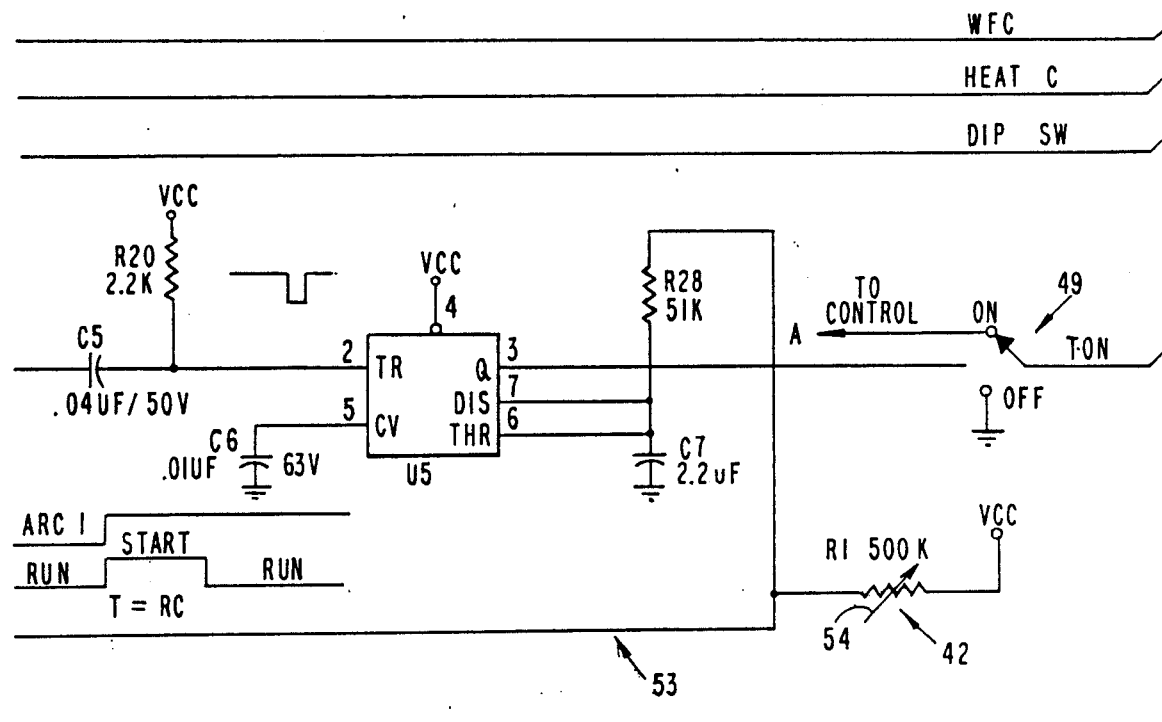
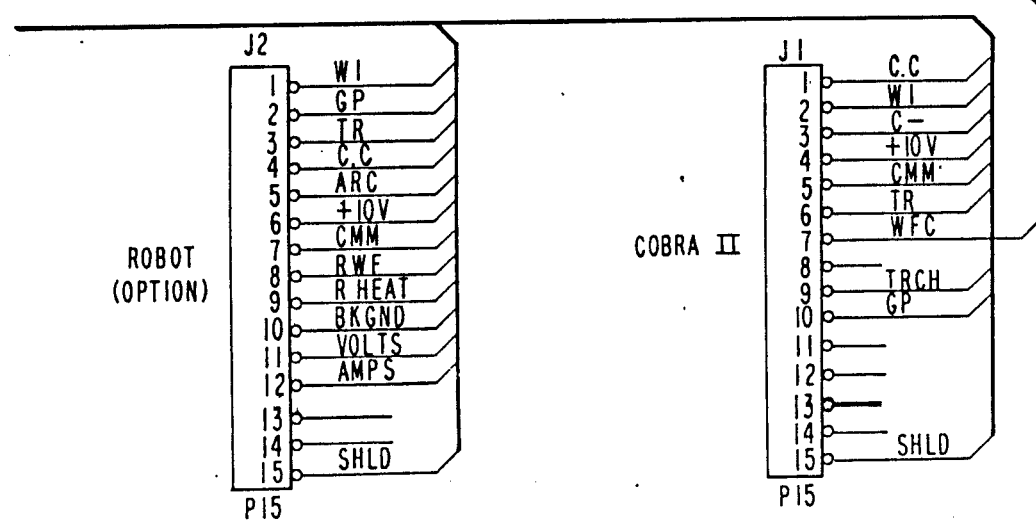
FIG. 5 CONT.

CONTROL UNIT FOR WELDING APPARATUS HAVING OFFSET AND TRACKING CONTROL FEATURES

BACKGROUND OF THE INVENTION

1. Field of the Invention:

This invention relates to a control unit for a welding apparatus, and particularly one that controls the heat input at the welding site in accordance with the wire feed rate and is adapted to be manually adjusted to accommodate different types of wires and welding processes.

2. Background Discussion:

In the art of welding it is conventional to use electric power as a source of heat. A specific type of wire as determined by the particular welding process is fed to the workpiece and an electric current is applied to the wire to create an arc between the wire and the workpiece when the wire is brought into proximity to the workpiece. The level of electric power, that is, the current flowing between the wire and workpiece, is determined by number of parameters, including the type and thickness of workpiece, the shielding gas which is employed to shield the wire and workpiece from the surrounding atmosphere, and the wire feed rate. If these parameters are not properly balanced, the weld will be defective.

One welding technique employs pulses of electric current to heat the wire. In pulse welding, metal transfer only occurs during current pulses. The duration of the pulses is determined by the wire diameter and type of welding process, for example, welding different workpieces such as steel or aluminum. The heat into the weld is controlled by the rate at which the pulses occur. The pulse repition rate determines the pulse period, the interval between respective points on the pulse. The heat input may then be defined as the percent of the pulse period during which the pulse is "on." For example, if the pulse is on 2 milliseconds out of an 8 millisecond period, the pulse is on 25 percent of the time. When the pulse is not "on," a background current is usually applied to maintain the arc and to keep the workpiece hot, without causing metal transfer from the wire.

For a given welding process, the rate at which the wire is fed to the workpiece will vary depending upon the objectives and skill of the workman doing the welding. If a thick work piece is being welded, for example, the rate at which the wire is fed to the workpiece will be increased, requiring more current or heat input. Alternatively, a larger diameter wire could be employed. In some instances, welding is conducted by robots which move the welding torch at a specified rate relative to the workpiece and the wire feed rate. The type of wire and shielding gas are selected for the given workpiece and the desired weld. If the workman decides to move the welding torch at a greater rate of speed or, if the robot is reset to move the torch at a greater rate of speed than initially established, the wire feed rate must be increased. An adjustment in the power supply to increase the current being applied to the wire must be made, requiring both skill and experience. Two adjustments must be made. One for the wire feed rate, and the other for the heat input or current. Sometimes two workman must be employed to achieve these two adjustments.

SUMMARY OF THE INVENTION

The present invention provides a control unit which employs a single control knob that may be manually manipulated by the workman to regulate the wire feed rate and automatically adjust the power supply to provide the correct current to the wire to produce a high-quality weld. This control unit includes means providing a plurality of control domains based on empirical test data that relates the current level or heat input for a selected type of wire to the feed rate for this selected type of wire. Thus, several different types of wire may be utilized. Prior to commencing welding the control domain is selected. The control unit includes manually adjustable control dials that are set (usually by a welding engineer) for the type of wire selected so that the workman may thereafter simply adjust the wire feed rate by means of a single control knob without making a separate manual adjustment in the heat input. The pre-established control domain based on imperical test data insures production of a consistent and high-quality weld. Any user of the contol unit of this invention may indepantantly conduct a series of tests, or in some instances based on known data, derive a curve which establishes the linear relationship between the heat command and the wire feed rate command for a particular welding process and weld wire.

There are several features of this invention, no single one of which is solely responsible for its desirable attributes. Without limiting the scope of this invention as expressed by the claims, its more prominent features will now be discussed briefly. After considering this discussion, and particularly after reading the section of this application entitled "DETAILED DESCRIPTION OF THE PREFERRED EMBODIMENT," one will understand how the features of this invention provide its advantages.

The first feature of this invention is that the control unit includes pulse control means having a plurality of control domains. A conventional welding power supply generates a pulsed arc between the wire and workpiece and the pulse control means determines the number of pulses in a given time interval. The higher the pulse rate the higher the heat input. The rate at which the arc is pulsed is controlled by the control unit of this invention as a function of the wire feed rate. It may be determined by experimentation using different wire types to discover what the correct heat input or pulse rate is required to produce a high-quality weld for the selected wire type fed at a given wire feed rate. A number of different feed rates are selected and the heat input is determined to establish the relationship between the heat input and the wire feed rate for the type of wires tested. In other words, a curve which represents a control domain is generated that establishes the relationship between the heat command and the wire feed rate for a particular welding process and wire type. (This information may also be available without experiment based on derivation of a curve from known data.)

The second feature of this invention is that anyone skilled in welding technology such as a welding engineer may develop a set of curves that provide suitable "offset" and "tracking" settings for different welding processes. The "offset" and "tracking" settings, as will be explained in greater detail below, are usually set by the welding engineer when he initially sets up the welding job for the workman. These setting are determined by the type of welding process and the wire type employed. This gives the user the opportunity to create a wide variety of contol domains corresponding to the multitude of welding processes and wire types which may be employed. Thus the control unit of this invention is highly versitile.

The third feature is that the control unit includes means for manually selecting which of the control domains is to govern the pulse rate in accordance with the welding process and type of wire selected by the workman or welding engineer. Each of the control domains provides a range of heat input corresponding to a range of wire feed rates for the selected type of welding process and wire type. This enables the workman to decide what type of wire to use for a given welding job and then, through a single adjustment or control knob, to vary the wire feed rate, with the control unit automatically changing the heat input as required to provide high-quality weld.

The forth feature is that the control unit employs off-set control means which accounts for the fact that the wire feed rate must be greater than zero at the point where the heat command setting on the control unit is at zero. Even with the heat setting of the control unit at zero, some background current is applied to the wire to create conditions which favor the rapid formation of an arc when pulsed current is applied to the wire and keep the workpiece hot. Thus, the offset setting. Some wire types require that pulse initiation commence at relatively high wire feed rates, whereas other types of wire will require that the pulsed current be initiated at substantially lower feed rates. The offset is adjusted for the type of wire employed.

The fifth feature is that the control unit includes tracking control means for establishing the differential in the change of the heat input in relation to the differential in the change of the wire feed rate for the selected wire type. This is a linear relationship over the range of interest. When the wire is being fed at a faster feed rate, more heat must be applied to it in order to produce a high-quality weld. Slowing the wire feed rate down requires less heat. Each type of wire will have its own curve establishing the relationship between heat input and wire feed rate. The tracking control means sets the slope of each curve for each type of wire for which a control domain has been determined.

The sixth feature is that the control unit has start-up control means which provide an increased heat input at the start of welding over that which normally prevails after start-up and where conditions have stabilized. At the start of welding the workpiece is cold and more current or heat is required to create an arc between the weldpiece and the wire and to melt the work piece so that proper weld penatration is obtained than later in the welding process when the workpiece is heated. In accordance with this feature of the invention, at start up the arc is sensed and, when present, a higher heat input is applied for a predetermined time period, which is manually adjustable. Thus, for example, the workman may for the first second of operation at start-up apply fifty percent more heat input than is required to produce a good weld after start-up. When this time period has elapsed, the heat level is automatically reduced to the level required to produce the high-quality weld at the wire feed rate employed.

The preferred embodiment of this invention illustrating all its features will now be discussed in detail in connection with the accompanying drawing.

BRIEF DESCRIPTION OF THE DRAWING

The control unit for welding apparatus of this invention is illustrated in the drawing, which is for illustrative purposes only, and wherein like numerals indicate like parts, and in which:

FIG. 2 is a graph showing three typical curves generated by empirical testing for different wire types used in welding at different feed rates and heat input.

DETAILED DESCRIPTION OF THE PREFERRED EMBODIMENT

Figure 1:
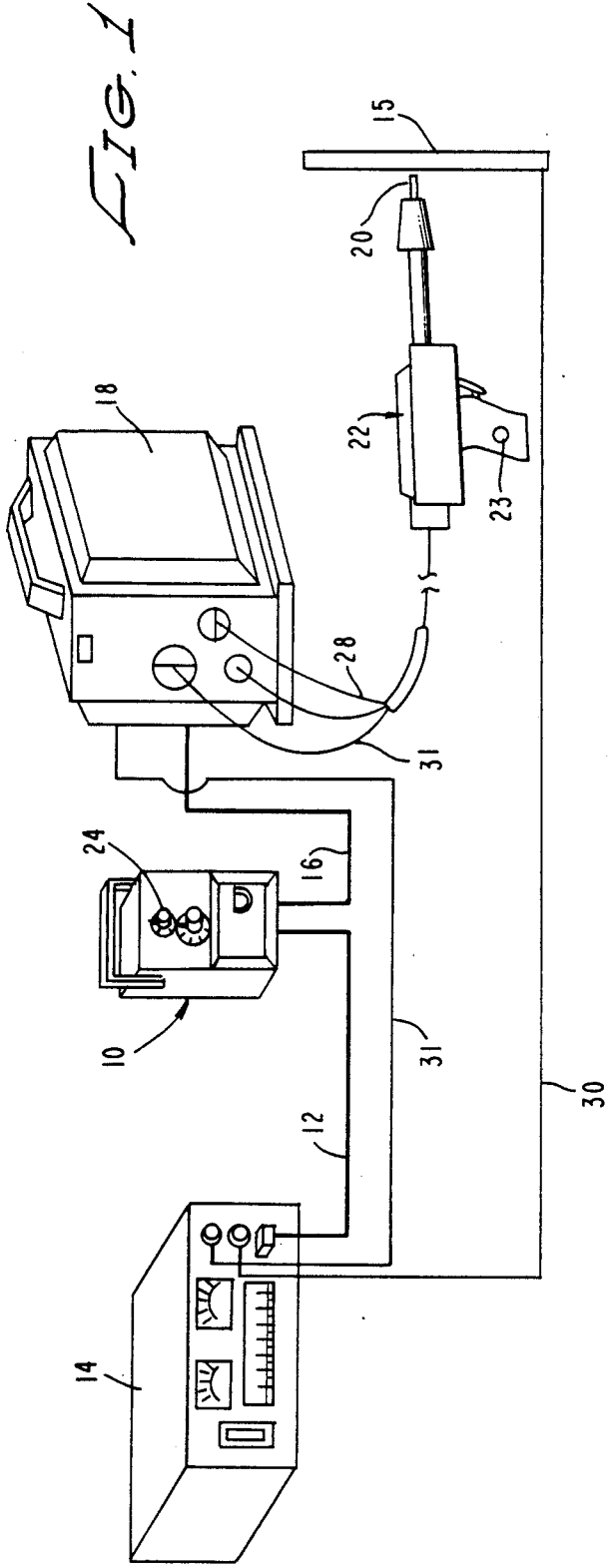
FIG. 1 is a perspective view of the control unit of this invention connected to a conventional pulsed power supply and a controllable conventional wire feeder used in welding.

As illustrated in FIGS. 1 through 5A, the control unit of this invention provides "hot start" and "steady-state" control functions. Hot start refers to employing a higher heat input at start-up, and steady-state control refers to a single adjustment to simultaneous reset both wire feed rate and heat input.

The control unit 10 includes a control signal line 12 connected to a conventional pulsed power supply 14 which controls the pulse rate or heat input to the workpiece 15. The control unit 10 also includes a contol signal line 16 connected to a conventional wire feeder 18. The wire feeder is disclosed in U.S. Pat. No. 3,562,577 which is sold by the assignee of the present application, M.K. Products, Inc., of Irvine, CA, under the trade name Cobramatic II. The wire feeder 18 is of the type that establishes a linear relationship between the wire feed rate and the command control characteristic. M. K. Products also makes a suitable power supply which is sold under the designation M. K. 2000A. This wire feeder 18 has a control characteristic whereby the pulse repetition rate response linearly to a heat command. Welding wire 20 is fed to a welding torch 22 by the wire feeder 18 at rates which are controlled by the main control knob 24 of the control unit 10. The workman by adjusting the position of the pointer 26 (FIG. 3) on the control knob 24 either increases or decreases the rate at which wire is fed to the welding torch 22 and simultaneously adjusts heat input as required to produce a high quality weld. A shielding gas is supplied through the gas hose 28 to the site where the welding wire 20 contacts the workpiece so that the welding wire is surrounded with gas as it is brought into proximity with a workpiece 15. Electrical current is applied through the cables 30 and 31 respectively to the workpiece 15 and the wire 20. The welding torch 22 is suitably insulated to prevent the workman from being shocked. Current is fed via the cable 31 from the power supply 14 through the cabinet of the wire feeder 18 to the torch 22 and the control unit 10 regulates the pulse rate of the arc created between the wire 20 and the workpiece 15. Increasing pulse rate increases heat input and vice versa.

For any particular welding process, the heat input applied to the wire 20 is a function of several parameters including the type of wire, that is, wire composition and wire diameter, the type of workpiece, that is, the composition of the workpiece and its thickness, the composition of the shielding gas, and the wire feed rate. Once the wire type has been selected for use with a given workpiece using a specific shielding gas, and the power supply parameters (including pulse level, background level, pulse and background slope, inductance, and pulse width) are set, the only two variables that have a major impact on the quality of the weld are the wire feed rate and the heat input. One way of controlling the heat input is to regulate the repetition rate of the pulses. In other words, if the wire feed rate is rapid more heat should be applied, and therefore the current should be turned off less frequently than at a slower wire feed rate. Each wire type will have its own set of heat commands corresponding to different pulse repetition rates for different wire feed rates.

In accordance with one feature of this invention, the control unit 10 provides a plurality of different control domains. Each control domain corresponds to a particular wire type fed at different rates where the heat command has been determined to provide welds of high quality for the wire type under test. As shown in FIG. 2, three different wire types were selected to gather empirical test data to produce the three curves, labeled, A, B, and C, corresponding to the three different wire types. Each curve is displayed on a graph having coordinates x and y which intersect at an origin 0. The y coordinate is designated as the Heat Command with a scale of percent pulse "on" time times 10 (5 on the scale represents a pulse "on" 50%). The x coordinate, or IPM Command, is designated as the wire feed rate expressed in inches per minute divided by 100 (5 on the IPM scale corresponds to 500 inches per minute). The units chosen result in a standardized command range commonly employed of from 0 to 10 volts, with 10 volts representing full output of each parameter (1000 inches per minute and 100% pulse output).

Curves A, B, and C, each intersect with the x coordinate at different points from the origin 0. In other words, they are off-set differently depending on the wire type. In this example, if the wire 20 is being fed at a rate of speed less than about 125 inch per minute, the Heat Command is at the background level. Once the wire feed rate exceeds this rate, the heat input must be increased. The off-set adjustment, for example, for wire type B must be initiated sooner than the off-set adjustment for wire type A, with wire type C requiring off-set adjustment subsequent to types A and B. Each of the curves A, B, and C, have different slopes. These different slopes correspond to the tracking adjustment for the control unit 10. Curve A has a slope of 3, curve B has a slope of 2, and curve C has a slope of 1. The curves indicate a linear relationship between heat input and wire feed rate.

Figure 3:
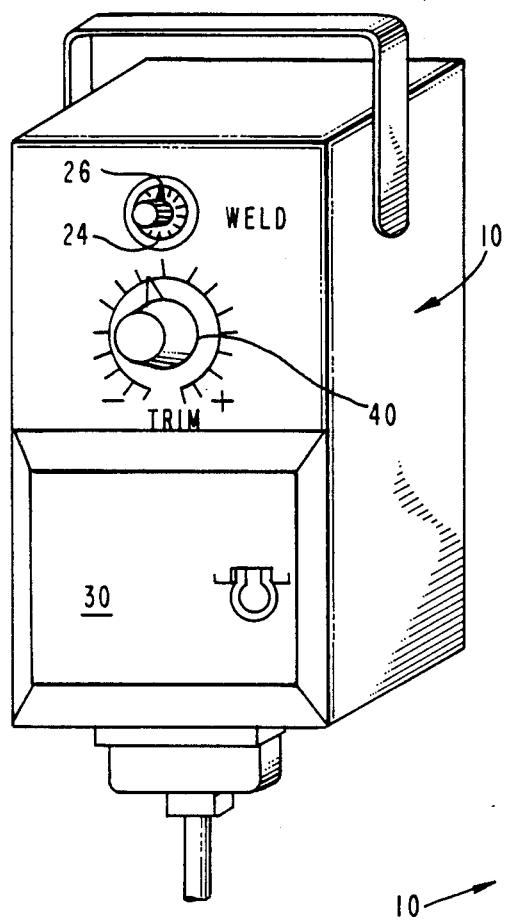
FIG. 3 is a perspective view of the control unit of this invention.
Figure 4:
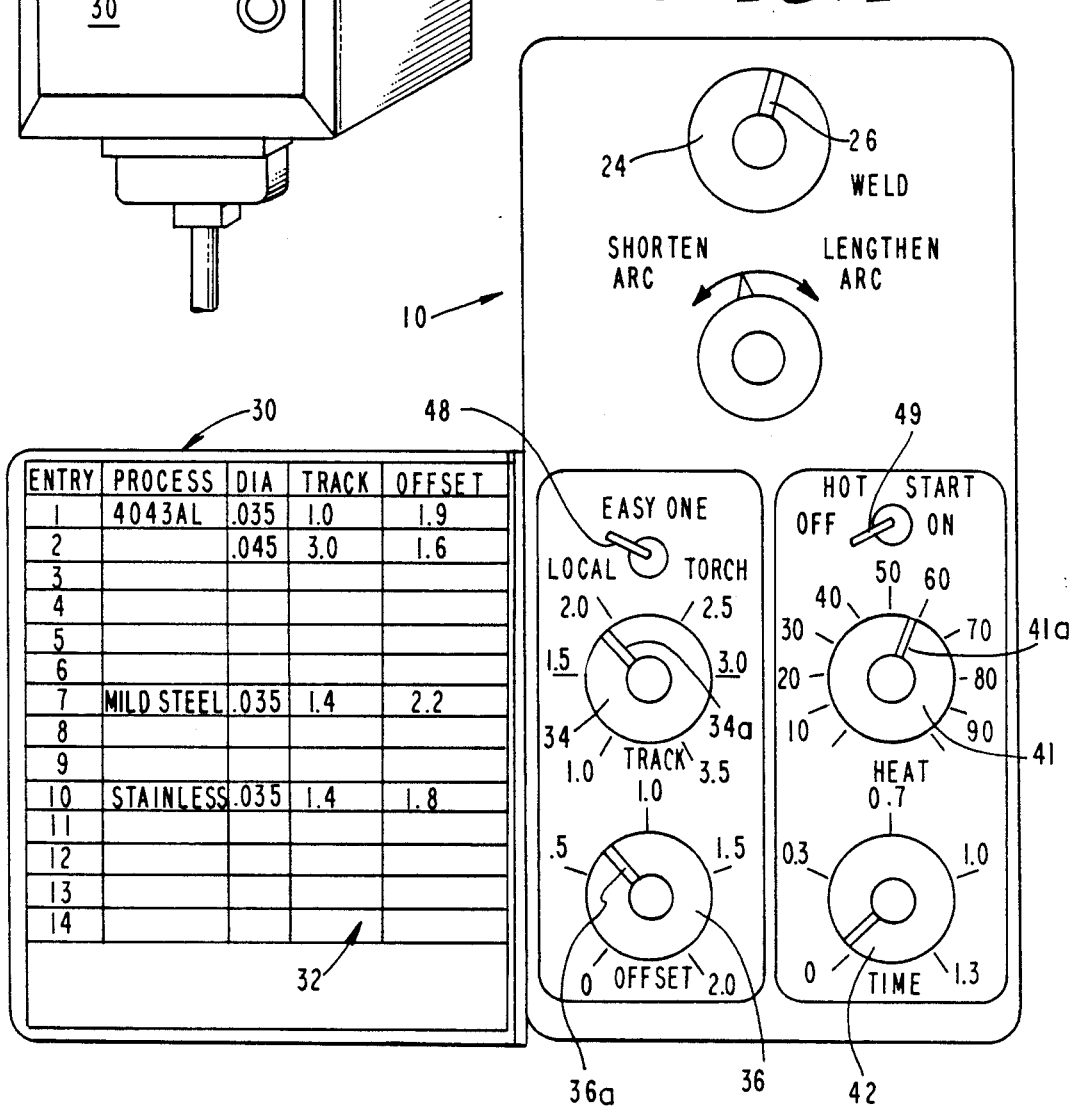
FIG. 4 is a front view of the control unit shown in FIG. 3 with its front door open.

As shown in FIG. 3 and 4, the control unit 10 has a door 30 which is opened manually. On the inside of the door 30 there is a table 32 setting forth the various settings for the tracking and off-set control functions. The door 30, when opened, exposes two dials, dial 34 and dial 36. Dial 34 sets the tracking function and dial 36 sets the offset function. Dial 34 is rotated so that its pointer 34a is set at the number for the correct tracking control called for by the table 32. Dial 36 is rotated so that its pointer 36a is set at the number for the correct off-set control called for by the table 32. At set up, the welding engineer simply manually sets the dials 34 and 36 for the type of wire employed in a given process. For example, if the process uses a 4043 aluminum alloy with a diameter of 0.035 inch, the tracking dial pointer 34a is set at 1.0 and the off-set dial pointer 36a is set at 1.9. This represents a slope of 1 (a 1 volt change in heat for a 1 volt change in the IPM) and an offset of 1.9 (the wire feed rate corresponding to the 0 Heat scale at 1.9 times 100, or 190 inches per minute). The control unit 10 is not used at Heat outputs below approximately 1, that is, or below 10% pulse "on" time. Another type of wire will require a different off-set and tracking setting.

At set up, the welding engineer sets the offset and tracking control dials 34 and 36 to regulate the amount of heat input to the workpiece 15 based on the selected wire to be used with the welding process being employed. This sets the differential in the heat input relative to the differential in wire feed rate. Thus, when the workman manipulates the main control knob 24 to vary the wire feed rate, the heat input will be changed the appropriate amount proportionally as determined by the tracking setting to correspond to the feed rate to provide a weld of high quality. When a different wire is selected, the welding engineer simply readjusts the tracking and off-set dials 34 and 34 as set forth in the table 32 to, in effect, establish a new set of heat input and wire feed rate commands, shifting from one curve to another curve as shown in FIG. 2. That is, the welding engineer changes the control domain for the new wire type and welding process to be used. The door 30 is provided to cover the offset and tracking dials 36 and 34. The workman thus only need be concerned with the position of the knob 26.

In some instances, the workman may desire to fine tune the heat input independent of wire feed rate. A trim control function as determined by the setting of a trim dial 40 is used for this purpose. Adjustment of the position of the trim dial 40 does not effect wire feed rate, only heat input. Consequently, the workman may increase or decrease heat input without altering the wire feed rate by adjusting the trim dial 40.

In accordance with another feature of this invention, the control unit 10 has a hot-start function that allows the workman to adjust for start-up conditions. As discussed above, more heat must be applied to the workpiece at start up than when the workpiece 15 is heated. Since the tracking and offset dial 34 and 36 have been set to provide a good weld condition over a wide range of wire feed rates and corresponding heat levels, it is now relatively easy to increase the wire feed rate and heat during the first fraction of a second of weld at start-up. Dial 41 is provided to set the wire feeed rate and corresponding heat level during start-up. The function and range of dial 41 is identical to dial 24 which is used during steady-state conditions to control wire feed rate and heat input. The setting of dial 41 is usually set at a value substantially higher than the setting of dial 24 so that the weld has increased heat and penetration when first initiated. The duration of the "start-up" phase is measured from receipt by a control circuit 50 of an "arc established" signal from the power supply 14 and it ranges from 0 to 3.0 seconds typically. This "hot start" feature is very general, and the "hot start" setting may be below the "steady state" setting, if for example, a tapered weld is desired.

By a process of trial and error, the workman increases the heat input at start up so that it is at some level greater than what would be required for a weld of good quality at a given wire feed rate for the wire type selected once the workpiece 15 is heated. The the IPM setting is set by the position of the dial 41 (FIG. 4). A timer dial 42 (FIG. 4) is provided which is manually set to maintain the selected heat input for a brief period of time typically ranging from 0.3 to 3.0 seconds. As will be discussed in greater detail below, the control circuit 50 shown in FIG. 5 provides a timing control function which is started when the presence of the arc appearing across the wire 20 and weld piece 15 is detected. When the preset time period expires and the timing function discontinues, the control circuit 50 automatically switches the control unit 10 of the power supply 14 to its steady-state operation as established by the setting of dial 24.

The control unit 10 carries two manually operable toggle switches 48 and 49. Switch 48 serves to turn over control of the function of the knob 24 to a knob 23 on the torch 22. Thus, the workman may adjust the wire feed rate and heat input from a contol knob on the torch rather than on the unit 10. The switch 49 serves to either activate or deactivate the "hot start" function.

CONTROL CIRCUIT

Figure 5A:
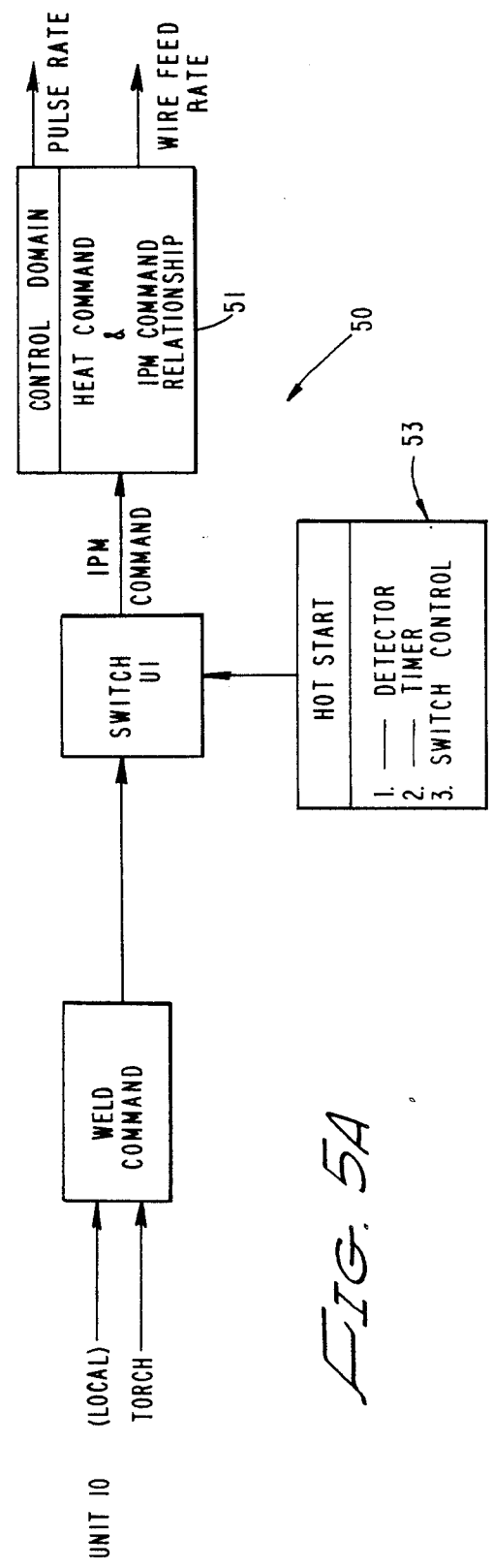
FIG. 5A is a simplified control circuit diagram.
Figure 5:
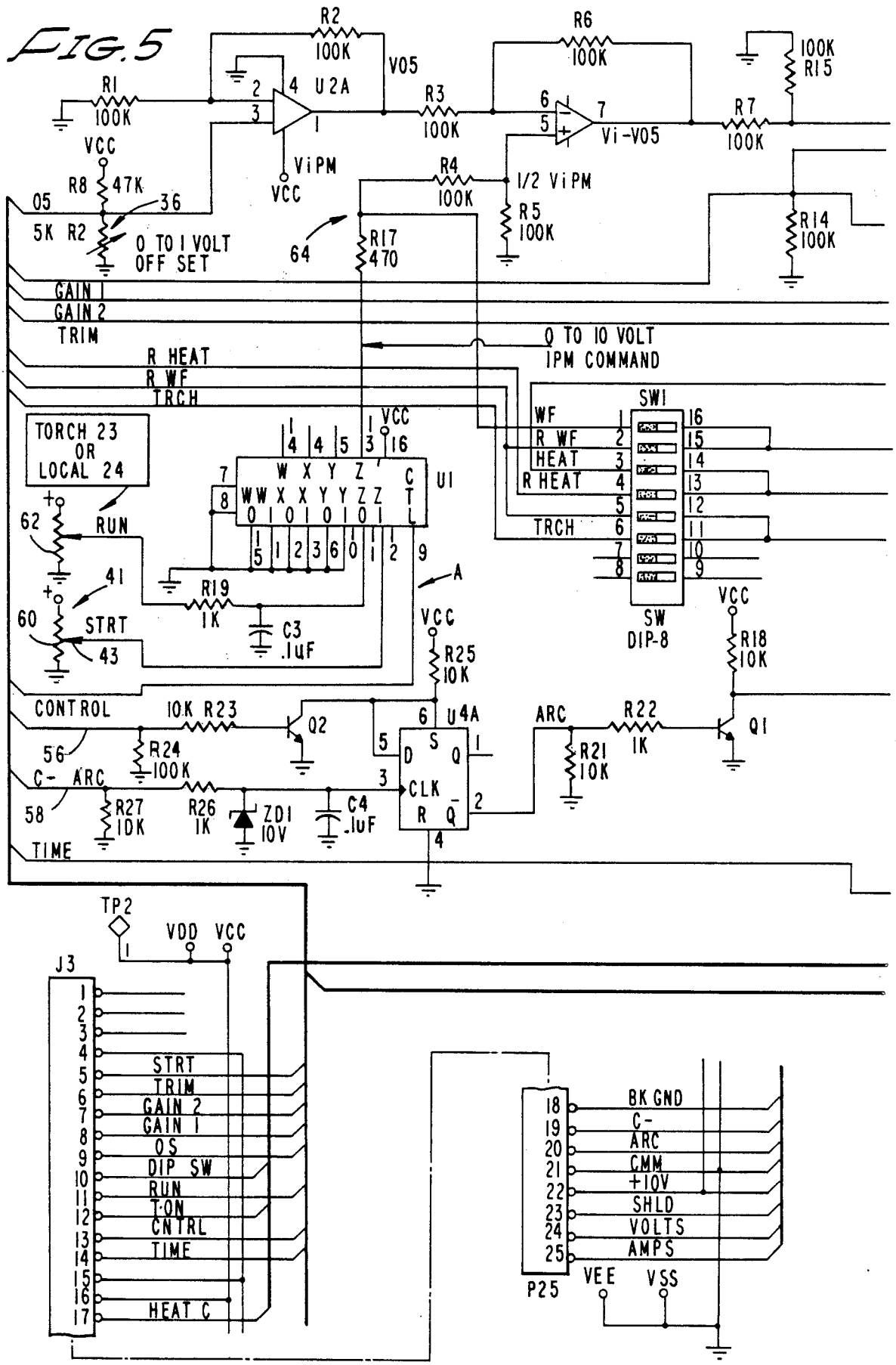
FIG. 5 is a schematic diagram of the control circuit for the control unit of this invention.

FIG. 5A is a simplified diagram showing the principle functions of the control circuit 50 utilized in this invention. A solid state, single throw, double pole switch U1 serves as the control means to switch between the "hot start" and "steady-state" functions. Depending upon the position of the hot start switch 49 on the control unit 10, the hot start function will either be on or off. If it is off, the heat and wire feed rate commands are controlled solely by either the knob 24 on the control unit 10 or knob 23 on the torch 22. This may be accomplished either manually or by robotic computer contol. The knobs 34 and 36 provide the input signals for the control domain circuit 51 which establishes the relationship between the heat input and the wire feed rate which responds to the workman making a single adjustment in the feed rate, for example, by positioning knob 24. If the "hot start" function is on the IPM command it is controlled by the "hot start" circuit 53, and specifically by the position of dial 41. If the workman chooses to make the trim adjustment for the heat input afterward, he simply turns the trim dial 40. The hot start circuit 53 has three main functions: (1) to detect when the time period as set by the position of the dial 42 should commence, (2) a clock or timer function, and (3) the switch control to turn over control between the "hot start" and "steady-state" control. The control domain circuit 51 has two main functions: (1), to set the heat input or pulse rate, and (2) to set the wire feed rate.

Assuming the hot start switch 49 is in the "on" position as illustrated in FIG. 5, there is then placed on the line 9 to the switch U1 a voltage to set the switch U1 so that the hot start function is operational. Positioning the dial 41 determines the position of the wiper 43 to set the IPM command signal to the control domain circuit 51. The duration that this signal is applied to the heat and wire feed rate control circuit is set by the slider 54 of the potentiometer R1 connected to the timer U5, which provides for time intervals of from 0.3 to about 3.0 seconds. The dial 42 sets the slider 54 position. Actuation of the trigger contactor on the torch 22 provides one initiation signal. Another initiation signal from the welding power supply 14 indicates when an arc has been established by sensing the flow of welding current. These two signals are used to start of the timing cycle.

Operation commences by generating a signal when the trigger of the torch is pulled to actuate a contactor. This signal is applied to line 56. At this time the control circuit 50 connects the local (or torch) potentiometer into the circuit through resistor R19 connected to the switch U1, with the capacitor C3 reducing line noise. This causes arc initiation to be at the steady state or background weld wire feed rate. As soon as the arc is established, as evidenced by receipt of the arc establish signal applied to line 58, the hot start timing begins and the hot start potentiometer 60 is connected to establish the wire feed rate and the corresponding power supply heat output. In other words, with the hot start feature activated as soon as the arc is established, the wire feed rate and heat input are increased to the level as established by the position of the dial 41. This high output level is maintained by the timer U5 and then the wire feed rate is returned to the run value set by the position of the knob 24 or torch knob 23.

The hot start function substitutes the start wire feed rate command for the command of the knobs 24 or 23. Switch U1 is an anlog switch which has the start potentiometer 60 and local/torch potentiometer 62 as inputs to one single pole double throw section. The output of the switch U1 goes to an input of an operational amplifier U2b through a voltage divider 64. This output from the switch U1 is controlled by the output of the integrated circuit timer U5, which is normally low causing the local/torch value to be selected.

The start function is initiated by detecting the change in the contactor signal. This is low when the contactor is off and goes high when the contactor is activated. A high contactor signal turns on a transistor Q2, causing the set terminal of the flip-flop U4A to go low. The initial state of the flip-flop U4A is Q-bar low. When set by the contactor signal, the flip-flop U4A will accept a clock signal from the arc established input signal. Receipt of the arc. established input signal causes the flip-flop U4A to change states and Qbar to go high. Since the reset terminal signal is grounded, the flip-flop U4A will remain flipped regardless of additional changes in the arc established input signal until it is set again by the contactor going low causing the set input to go high.

When the output Q-bar goes high, a transistor Q1 is turned on, causing the low end of a resistor R18 to go low. This voltage change is differentiated by a capacitor C5 and provides a trigger signal to the timer U5. The normal state of the output Q of the timer U5 is low. If triggered, this output Q of the timer U5 goes high for a period of time determined by the RC time constant of the circuit including resistor R28 and capacitor C7, with the potentiometer 54 being set to establish the time function by the position of the dial 42.

When Q of the timer U5 is high, the switch U1 is set to connect the output of the start potentiometer 60 to the U2B input driver. At the end of the time interval, Q goes low and the switch U1 returns to the control of the local/torch command as set by the potentiometer 62. The hot start circuit 51 is now insensitive to other changes until the contactor signal applied to line 56 again goes low to set the flip-flop U4A to another start cycle.

The control domain circuit 51 is designed to perform a simple calculation to determine the heat output command. In other words, the function of the control unit 10 may be expressed by the equation $$A = B(C - D)$$

Where

A is the output command to the power supply (percent "on time" divided by 10);

B is the slope of the curve, or change in A required in response to a change in B;

C is the wire feed rate command (inches per minute divided by 100);

D is the off-set expressed in the same units as the wire feed rate command.

Thus, for the curve A in FIG. 2, an off-set of 1.6 and a slope of 3 are required.

The desired IPM command (between 0 and 10 volts) for 1 to 1000 inches per minute, is inputted via the divider R4 and R5 to the plus terminal of the operational amplifier U2B. The negative terminal of the operational amplifier U2B receives its input from the output terminal of the operational amplifier U2A via the resistor R3. The operational amplifier U2A has its negative terminal grounded through the resistor R1 and a voltage proportional to a setting of the potentiometer R2 is applied to the plus terminal of this operational amplifier. The dial 36 set the position of the slider of the potentiometer R2. Since the amplification of the amplifer U2A is set at 2:1, the off-set voltage at the plus terminal is given a range of 0 to 1 volts or one half of the desired off-set. The output of the operational amplifier U2A is a voltage of 0 to 2 volts so the output of the operational amplifier U2b is twice the input to the positive terminal minus the input to the negative terminal. This provides the wire feed rate command minus the off-set voltage to the voltage divider comprising the resistor R7 and resistor R15 for the input to the positive terminal of the operational amplifier U3A.

The amplification to the signal provided by the operational amplifier U3A to the positive terminal input signal is determined by the ratio of the feed back resistance as established by the valve of the resistance of the resistor R16 plus the value of the variable resistor R5 divided by the value of the resistor R14. This has a minimum value of 2 when the potentiometer R5 is at a 0 and a maximum of 6 when the slider is placed at the other end of the scale. The dial 34 sets the position of the slider for the potentiometer R5. Since the input signal is divided by 2 by the voltage divider R7 and R15, the effective gain covers the range of 1 to 3.0. There is now at the output of the operational amplifier U3A a voltage which is the input wire feed rate command value minus the selected off-set value all multiplied by the slope (or gain) selected. The actual range of these factors may be changed for other values as desired if new welding processes indicate such a need.

In accordance with one feature of this invention, the trim factor is added to the control unit 10. This is added because not every workman will want the precise arc conditions given by the control unit 10, and not every setup is precisely the same. The operational amplifier U3B provides for the trim function, whereby the workman may provide a small off-set percent "on" time function going to the power supply without changing the wire feed rate input at all. The output of the operational amplifier U3A is divided by the voltage divider including resistor R9 and resistor R10 and applied to the positive terminal of the amplifer U3B. The trim potentiometer R3 may be adjusted to provide from 0 to 2 volts at the negative input of the amplifier U3B. The gain of U3B is set to 2 so its output is twice the positive terminal input minus the negative terminal input. Once set, the trim function applies to all operations until reset. Thus, if the workman desires to lengthen the arc slightly, for example by increasing the percent "on" time for the given wire feed rate, the trim control knob 40 is adjusted. This percent "on" time off-set applies to all changes in the wire feed rate. This trim function is designed to only reduce the heat level from the value with no trim. If it becomes necessary to increase the heat due to some particular process another operational amplifier using a negative power source could be used to provide such increase. An alternate way is to set the trim at mid-range while developing the parameter data for the offset function. Trim will then provide both increase and decreased heat.

SUMMARY

The control unit 10 accepts the wire feed rate command and passes it on to the associate wire feeder 18, processes the value by subtacting an off-set and multiplying by a gain or tracking factor to provide a command signal to the welding power supply 14, thereby controlling the percent "on" time of the pulsed output. The control unit 10 also has the added feature of a trim command which provides an off-set to the percent "on" time command to permit small adjustments in the welding arc by the workman.

When properly set up, the power supply 14 delivers a wide range of welding power output for use with particular processes and welding wires of different diameters by simply controlling the interval between the metal transfer pulses. This is because the current density required for material transfer is primarily determined by the electrode and base metals of the workpiece 15, and the shield gas used. The volt-ampere curve of the output during the pulse, the optimum circuit inductance, and the current output level, are fixed at a value near the maximum welding current capacity of the welding wire 20. At this power level there is a limit on how thin the work piece may be if burn through and unmanageable torch travel speeds are to be avoided.

The power level, averaged over a few seconds, may be reduced by using pulse welding where the transfer of the weld material from the weld wire 20 is interrupted between transfers and the arc kept "alive" by maintaining a low background current between current pulses. The length of the current pulse should approximate the time required to physically melt a drop off the electrode and transport it across the arc to the base metal. This time interval is almost entirely a function of the wire diameter and is typically from 1 to a few milliseconds for most common welding wire diameters. In between these pulses, the background current, preferably with a constant current voltage ampere slope, is not critical, but is usually chosen to keep the gas ionized and the base metal hot without melting a drop off the electrode.

The present invention is a simple control unit which automatically relates the heat output of the pulsed power supply 14 to the desired feed rate to achieve a good, consistent weld. By defining the total interval between two current transfer pulses as the pulse period, then the pulse width divided by the period (times 100) gives the percent on or pulse time. For example, if the current transfer pulse for a particular diameter in alloy wire is 2 milliseconds and the pulses occur every 8 milliseconds, the on time is 2 divided by 8 or 0.25 of the total period (or 25%). Reduced weld power is provided to approximately (ignoring the background contribution) 25% of its maximum value without disturbing the weld condition during the material transfer, i.e., during pulsing.

When the average power or heat going into the weld is reduced, the amount of weld wire 20 being fed into the weld must also be reduced. In the above example, it can be seen that only about one fourth as much energy is required to melt the wire 20. Thus the wire feed rate must be slowed down by nearly 4 times.

When the welding engineer performs his experimentations and records the percent of time the pulse is present and the corresponding feed rate and plots a graph as illustrated in FIG. 2, he will get a curve similar to the curve shown. These curves are straight lines over the range of interest, but they typically do not pass through the origin as explained above. Nor does the slope have a slope of unity or 45 degrees on the graph. The distance from the origin where a curve intersects the 0% pulse value has been called the off-set and the ratio of change in percentage pulse output to a change in the wire feed rate in inches per minute is the slope or tracking adjustment.

One can determine the off-set and slope of all the welding processes and welding wire diameters of interest and then easily calculate the required percent of pulse "on" time once the wire feed rate is known. It is the function of this invention to provide a very simple command to the input for the off-set and slope data and a simple circuit to actually create the desired command to the welding power supply to control the "on" time as a function of the selected wire feed rate. As long as the functions are linear over the region of interest, this control unit 10 may be easily constructed or adjusted to operate with any system of units.

The control unit 10 of this invention may also be modified to accommodate control inputs from a robot control computer and the circuit 50 includes the switch SH1 for this purpose. The input board J3 serves to connect the control unit to the power supply, the input board J2 connects the control unit to a robot, and the input board J1 connects the control unit to the wire feeder. When the robot control computer is used, the operation is essentially the same as described above, however, the wire feed rate command is accepted from the robot control and the heat output is directed back to the robot control.

SCOPE OF THE INVENTION

The above description presents the best mode contemplated of carrying out the present invention. This invention, however, is susceptible to modifications and alternate constructions from the embodiment shown in the drawing and described above. Consequently, it is not the intention to limit the invention to the particular embodiment disclosed. On the contrary, intention is to cover all modifications and alternate constructions coming within the spirit and scope of this invention as generally expressed by the following claims.

I claim:

1. In combination with welding apparatus for producing a weld of high quality where wire is fed at varying feed rates to a workpiece and an electrical current at different heat input levels is applied to the wire in the presence of a shielding gas to create a pulsed arc between the wire and work piece, said heat input level being a function of a number of parameters including the type of wire, the type of workpiece, the composition of the shielding gas, and the wire feed rate, a control unit for regulating the heat input to produce a weld of high quality, including:

means for controlling the pulse rate of said arc as a function of the wire feed rate including
  (a) pulse control means having a plurality of control domains that relate the pulse rate for a weld of high quality for a selected type of wire to the wire feed rates for said selected type of wire, each of said control domains providing a range of pulse rates corresponding to a range of wire feed rates for the selected type of wire, and
  (b) means for manually selecting which of the control domains is to govern the pulse rate in accordance with the type of wire selected, including
    off-set means for initiating control of the pulse rate when the wire feed rate reaches a predetermined minimum for the type of wire selected, and
    tracking means for establishing the differential and change of the pulse rate in relation to the differential and change of the wire feed rate for the selected type of wire.

2. The combination of claim 1 including start-up control means which provide an increased wire feed rate and heat input at the start of welding compared to that which normally prevails after start up when conditions have stabilized.

3. In a welding apparatus, the combination including
means for feeding a welding wire to a workpiece, including
means for controlling the wire feed rate,
means for applying electrical power to the wire to generate a pulsed arc between the wire and the workpiece to melt the wire and workpiece and form a weld,
means for controlling the pulsed arc, including means for changing the pulse rate in accordance with the wire feed rate in a manner that provides a weld of high quality,
means for providing a plurality of control domains for regulating the pulse rate in accordance with the type of wire and welding process employed as a function of the selected wire feed rate, and
means for manually selecting which of said control domains governs the pulse rate, including
off-set controls means for initiating control of the pulse rate when the wire feed rate reaches a predetermined minimum for the type of wire selected, and
tracking control means for establishing the differential in the change of pulse rate in relation to the differential in the change of wire feed rate for the selected type of wire.

4. The combination of claim 3 including start-up control means which provides a separate feed rate and corresponding heat input at the start-up of welding compared to that which normally prevails after start-up when conditions have stabilized.

5. In a welding apparatus, the combination including
means for feeding a welding wire to a workpiece, including means for controlling the wire feed rate,
means for applying electrical power to the wire to generate an arc between the wire and workpiece to melt the wire and the workpiece and form a weld,
means for adjusting the power level to regulate the heat input in accordance with the wire feed rate in a manner that provides a weld of high quality, and
start-up control means which applies an independently set feed rate and corresponding heat input to the wire over that which normally prevails after conditions stabilize, said excess power being applied for a predetermined and manually adjustable time period when welding is initiated as indicated by formation of said arc, and domain control means having a plurality of control domains that relates the heat input corresponding to a weld of high quality for a selected type of wire to the wire feed rate for said selected type of wire, means for manually selecting which of the control domains the heat input in accordance with the type of wire selected, and each of said control domains providing a range of heat inputs corresponding to a range of wire feed rates for the selected type of wire, said domain control means including off-set controls means for initiating control of the pulse rate when the wire feed rate reaches a predetermined minimum for the type of wire selected, and tracking control means for establishing the differential in the change of pulse rate in relation to the differential in the change of wire feed rate for the selected type of wire.

6. The combination of claim 5 including means for sensing the presence of the arc at start-up and beginning the time period after sensing said arc.

7. In a welding apparatus, the combination including means for feeding a wire to a workpiece, including means for controlling the wire feed rate, means for applying electrical power to the wire to generate an arc between the wire and the workpiece to melt the wire and the workpiece and form a weld, means for adjusting the power level to regulate the heat input in accordance with the wire feed rate in a manner that provides a weld of high quality, means for providing a plurality of control domains for regulating heat input in accordance with the type of wire and welding process employed, and means for manually selecting which of said control domains governs the heat input, including off-set controls means for initiating control of the pulse rate when the wire feed rate reaches a predetermined minimum for the type of wire selected, and tracking control means for establishing the differential in the change of pulse rate in relation to the differential in the change of wire feed rate for the selected type of wire.

* * * * *